United States Patent
Osterloh et al.

(10) Patent No.: US 7,372,372 B2
(45) Date of Patent: May 13, 2008

(54) SEQUENCE INVERSION KEYED COUNTDOWN TIMER UTILIZED WITHIN A UTILITY METER SYSTEM

(75) Inventors: Christopher L. Osterloh, Waseca, MN (US); Christopher Nagy, Waseca, MN (US)

(73) Assignee: Itron, Inc., Libery Lake, WA (US)

( * ) Notice: Subject to any disclaimer, the term of this patent is extended or adjusted under 35 U.S.C. 154(b) by 416 days.

(21) Appl. No.: 10/900,993

(22) Filed: Jul. 28, 2004

(65) Prior Publication Data

US 2005/0052288 A1    Mar. 10, 2005

Related U.S. Application Data

(60) Provisional application No. 60/500,479, filed on Sep. 5, 2003, provisional application No. 60/500,504, filed on Sep. 5, 2003, provisional application No. 60/500,507, filed on Sep. 5, 2003, provisional application No. 60/500,515, filed on Sep. 5, 2003, provisional application No. 60/500,550, filed on Sep. 5, 2003.

(51) Int. Cl.
*G08C 15/06* (2006.01)

(52) U.S. Cl. ............... 340/870.02; 340/870.01; 340/870.03; 705/8

(58) Field of Classification Search ........... 340/870.02, 340/870.01, 870.03, 870.11; 455/341, 342, 455/345, 346, 347, 343.2; 705/8
See application file for complete search history.

(56) References Cited

U.S. PATENT DOCUMENTS

| | | | |
|---|---|---|---|
| 5,056,107 A | 10/1991 | Johnson et al. | |
| 5,432,814 A * | 7/1995 | Hasegawa | 375/133 |
| 5,438,329 A * | 8/1995 | Gastouniotis et al. | 340/870.02 |
| 5,553,094 A | 9/1996 | Johnson et al. | |
| 5,883,886 A * | 3/1999 | Eaton et al. | 370/314 |
| 5,914,673 A | 6/1999 | Jennings et al. | |
| 5,920,850 A * | 7/1999 | Hunter et al. | 705/405 |
| 5,999,561 A | 12/1999 | Naden et al. | |
| 6,061,453 A | 5/2000 | Bach | |
| 6,073,169 A | 6/2000 | Shuey et al. | |
| 6,172,616 B1 | 1/2001 | Johnson et al. | |
| 6,246,677 B1 | 6/2001 | Nap et al. | |
| 6,304,191 B1 | 10/2001 | Campbell et al. | |
| 6,373,399 B1 | 4/2002 | Johnson et al. | |
| 2002/0158774 A1 | 10/2002 | Johnson et al. | |
| 2003/0001754 A1 | 1/2003 | Johnson et al. | |
| 2003/0048199 A1 * | 3/2003 | Zigdon et al. | 340/870.02 |

FOREIGN PATENT DOCUMENTS

WO    WO 9965169    12/1999

* cited by examiner

*Primary Examiner*—Jeffery Hofsass
*Assistant Examiner*—Sisay Yacob
(74) *Attorney, Agent, or Firm*—Patterson, Thuente, Skaar & Christensen

(57) ABSTRACT

An automatic meter reading system that includes a head end controller and an endpoint that is interfaced to a utility meter. The head end controller and the endpoint communicate via RF communication. The endpoint includes an internal clock that synchronizes itself to a clock countdown signal. The clock countdown signal is generated by the head end controller through use of sequence inversion keying.

20 Claims, 4 Drawing Sheets

SEQUENCE INVERSION KEYED COUNTDOWN TIMER UTILIZED WITHIN A UTILITY METER SYSTEM

CLAIM TO PRIORITY

The present application claims priority to U.S. Provisional Application No. 60/500,479, filed on Sep. 5, 2003 and entitled, "SYNCHRONOUS DATA RECOVERY SYSTEM."

RELATED APPLICATIONS

This application is related to commonly assigned U.S. Provisional Application No. 60/500,507, filed on Sep. 5, 2003, entitled, "SYSTEM AND METHOD FOR DETECTION OF SPECIFIC ON-AIR DATA RATE," U.S. Provisional Application No. 60/500,515, filed Sep. 5, 2003, entitled, "SYSTEM AND METHOD FOR MOBILE DEMAND RESET," U.S. Provisional Application No. 60/500,504, filed Sep. 5, 2003, entitled, "SYSTEM AND METHOD FOR OPTIMIZING CONTIGUOUS CHANNEL OPERATION WITH CELLULAR REUSE," U.S. Provisional Application No. 60/500,479, filed Sep. 5, 2003, entitled, "SYNCHRONOUS DATA RECOVERY SYSTEM," U.S. Provisional Application No. 60/500,550, filed Sep. 5, 2003, entitled, "DATA COMMUNICATION PROTOCOL IN AN AUTOMATIC METER READING SYSTEM," U.S. patent application Ser. No. 10/655,760, filed on Sep. 5, 2003, entitled, "SYNCHRONIZING AND CONTROLLING SOFTWARE DOWNLOADS, SUCH AS FOR COMPONENTS OF A UTILITY METER-READING SYSTEM," U.S. patent application Ser. No. 10/655,759, filed on Sep. 5, 2003, entitled, "FIELD DATA COLLECTION AND PROCESSING SYSTEM, SUCH AS FOR ELECTRIC, GAS, AND WATER UTILITY DATA," which are herein incorporated by reference.

FIELD OF THE INVENTION

The present invention relates to a method and system for collecting data from remote utility meters. More particularly, the present invention describes a method and a system for establishing communication between a reader of an automated meter reading system and a plurality of utility meters within that system utilizing the bit sequence of a sequence inversion keyed countdown timer.

BACKGROUND OF THE INVENTION

Wireless automatic meter reading systems are well known. Typically, each utility meter is provided with some type of encoder/receiver/transmitter endpoint, such as the Itron, Inc. ERT. In the instance of gas and water meters, that endpoint is likely battery-powered. The endpoint collects the meter readings and periodically transmits those readings over a network to a central station. The power limitations imposed by the need for the endpoint to be battery powered and by regulations governing radio transmissions often prevent direct radio transmissions to the central station. Instead, wireless meter reading systems utilize a layered network of overlapping intermediate receiving stations that receive transmissions from a group of meter encoders and forward those messages on to the next higher layer in the network as described, for example, in U.S. Pat. No. 5,056,107, which is hereby incorporated by reference. These types of layered wireless transmission networks allow for the use of lower power, unlicensed wireless transmitters in the thousands of endpoints that must be deployed as part of a utility meter reading system for a large metropolitan area.

In 1985, as an attempt to stimulate the production and use of wireless network products, the FCC modified Part 15 of the Radio Spectrum Regulation, which governs unlicensed devices. The modification authorized wireless network products to operate in the industrial, scientific, and medical (ISM) bands using spread spectrum modulation. The ISM frequencies that may be used include 902 to 928 MHz, 2.4 to 2.4835 GHz, and 5.725 to 5.850 GHz. The FCC allows users to operate spread spectrum wireless products, such as utility metering systems, without obtaining FCC licenses if the products meet certain requirements. This deregulation of the frequency spectrum eliminates the need for the user organizations to perform costly and time-consuming frequency planning to coordinate radio installations that will avoid interference with existing radio systems.

Currently, synchronization between a transmitter and a receiver is accomplished by using a synchronization pulse, which may interfere with hardware clock recovery, or by using Barker coding type approaches, which require receivers to stay on at length. However, these current synchronization techniques do not prevent collisions in endbound data packets as the endpoints are not time synchronized between the transmitter and receiver. This lack of endpoint synchronization further results in limitations on individual cell capacities as well as inherent difficulties in implementing message integration techniques.

Accordingly, there is a need for a battery efficient system for time synchronizing messages between transmitter and receiver that not only increases individual cell capacities but also allows for the implementation of two-way message integration techniques.

SUMMARY OF THE INVENTION

According to one aspect of the invention, there is disclosed a method for endpoint synchronization of a high capacity data stream using sequence inversion keying (SIK). Utilizing sequence inversion keying, a metering network is assigned a system ID that is represented by a specific bit number sequence. Through careful selection of the bit sequence, multiple system ID's, each with their own specific bit sequence, can be implemented within the same geographic area. When a remote utility meter recognizes its unique system ID, the meter continues reading data bits which can give instructions regarding functions to perform, regarding time synchronization with a central utility station, or regarding receiving transmissions of command and control data.

According to another aspect of the invention, there is disclosed a method for reducing battery consumption within individual remote utility meters used in forming metering networks. Each utility meter includes a receiver that includes means for receiving a signal transmitted by the reader of either a fixed or mobile utility station. The signal includes a series of unique data sequences which are specifically selected to identify a particular network from which information is desired to be collected. Using these unique data sequences, a utility meter can quickly determine whether the reader is requesting information from the utility meter. If the signal fails to include its unique data sequence, the utility meter immediately shuts down eliminating further battery consumption. If the signal does include the utility meter's unique data sequence, the utility meter continues listening to the signal through which are transmitted additional sequences that can correspond to specific actions to be undertaken by utility meters or to notices indicating when command and control data is to be transmitted. In the event that further command and control data is to be sent, the utility meter shuts down until the time indicated in the prior transmission at which time it powers up and listens to the sequence pertaining to command and control data. In this way, battery consumption is reduced by eliminating the wait time of the utility meter with respect to the transmission of command and control data. Accordingly, the method of the present invention provides for two layers of battery savings wherein one layer comprises quickly identifying desired networks using a unique data sequence and a second layer comprises synchronization with regard to receipt of command and control data.

Various embodiments of the present invention are directed to addressing various needs in connection with ensuring full coverage and receiving load-shedding feedback using an automatic wireless meter reading system.

In a preferred embodiment of the invention, an automatic meter reading system that includes a head end controller and an endpoint that is interfaced to a utility meter. The head end controller and the endpoint communicate via RF communication. The endpoint includes an internal clock that synchronizes itself to a clock countdown signal. The clock countdown signal is generated by the head end controller through use of sequence inversion keying. The clock countdown signal is preferably generated for less than 60 seconds for each hour in the day, and more preferably for 30 seconds or less for each hour in the day. The internal clock of the endpoint is preferably synchronized to the countdown signal every hour of every day. The internal clock may be synchronized to the clock countdown signal at any point during the generation of the clock countdown signal.

In a preferred embodiment, the endpoint is battery powered. The endpoint preferably operates on that battery power for less than 200 milliseconds, and more preferably 100 or less milliseconds, to synchronize the internal clock of the endpoint to the clock countdown signal. In another preferred embodiment, the endpoint includes the ability to re-acquire the clock countdown signal from the head end controller should the endpoint lose the communication with the controller.

A method for communication in an automatic meter reading system includes the steps of: (1) generating a clock countdown signal through the use of sequence inversion keying (SIK); (2) transmitting the clock countdown signal via RF communication; (3) obtaining the transmitted clock countdown signal; (4) synchronizing a clock to the obtained clock countdown signal; and (5) time-stamping utility meter data according to a time on the synchronized clock.

BRIEF DESCRIPTION OF THE DRAWINGS

The invention may be more completely understood in consideration of the following detailed description of various embodiments of the invention in connection with the accompanying drawings, in which.

Figure 1:
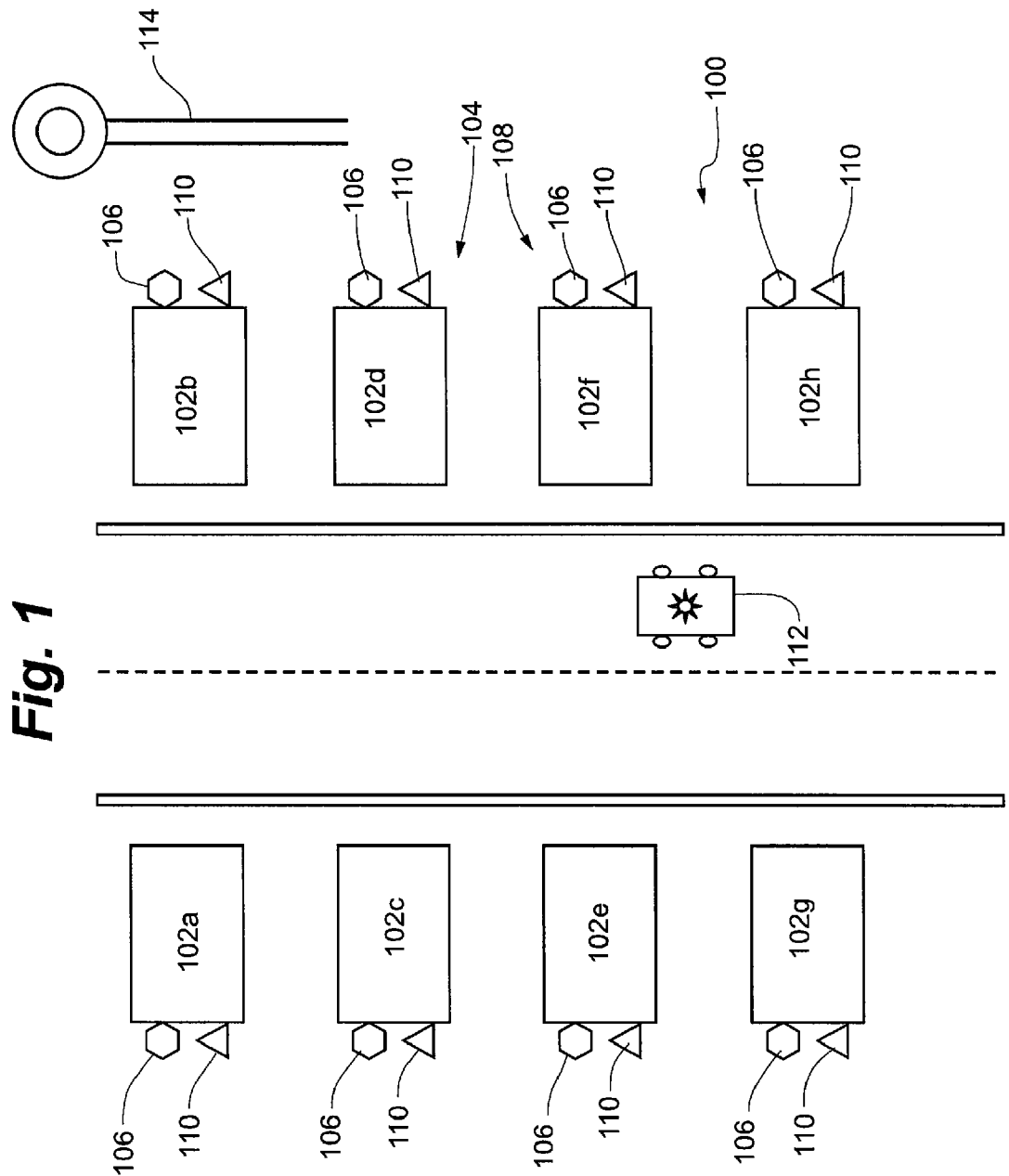
FIG. 1 illustrates a geographic area comprising a pair of fixed networks.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF PREFERRED EMBODIMENTS

The present invention is generally directed to a method and a system for collecting data from a plurality of automatic meter reading networks, each comprising multiple utility meters with interfacing endpoints, within a designated area. Through the use of network ID's represented by specific data bit sequences, data from specific individual networks in the geographic area can be collected. While the present invention is not necessarily limited to such an application, the invention will be better appreciated using a discussion of example embodiments in such a specific context.

Referring to FIG. 1, there is illustrated a geographic area 100, shown as a residential neighborhood, including a plurality of houses 102a, 102b, 102c, 102d, 102e, 102f, 102g and 102h. For purposes of describing the present invention, geographic area 100 is depicted as including two unique automatic meter reading networks within the boundaries of the geographic area 100. A first automatic meter reading network 104 comprises a plurality of remote first endpoints 106, for monitoring electrical consumption within the individual houses 102a, 102b, 102c, 102d, 102e, 102f, 102g and 102h. A second automatic meter reading network 108 comprises a plurality of remote second endpoints 110 for monitoring water consumption within the individual houses 102a, 102b, 102c, 102d, 102e, 102f, 102g and 102h. An alternative or additional network could include a plurality of endpoints interface to gas meters.

For purposes of illustration and clarity, it will be understood that the present invention is being described with reference to the geographical area 100 including only two automatic meter reading networks. It is to be understood that additional automatic meter reading networks can also operate within geographical area 100, the number of automatic meter reading networks being limited only by the length of the data sequences used in identifying each unique network as will be further described in the following paragraphs.

For purposes of illustration and clarity, it will be understood that the present invention is being described with reference to the geographical area 100 being comprised of a residential neighborhood. In addition to individual houses, it is to be understood that geographic area 100 can include multi-occupant dwellings, such as apartment buildings, condos, townhomes or duplexes, each multi-occupant dwelling having multiple remote electrical utility meters 106 and/or multiple remote water utility meters 110. In addition, it is to be understood that geographic area 100 can comprise alternative municipal uses including commercial and manufacturing facilities alone or in combination with residential facilities.

Generally, remote first endpoint 106 comprises an electrical power source, an electrical consumption meter, a receiver, a transmitter and a logic circuit. Alternatively, remote first endpoint 106 could be battery powered. The endpoints 106 are preferably Itron, Inc. ERT modules.

Generally, remote second endpoint 110 comprises a battery power source, a water consumption meter, a receiver, a transmitter and a logic circuit. Alternatively, remote second endpoint 110 could be electrically powered through hard-wiring to an electrical power source. The endpoints 106 are preferably Itron, Inc. ERT modules.

Data collected by the remote first endpoints 106 and the remote second endpoints 110 can be collected through either a mobile collection unit 112, e.g., a motorized vehicle or hand-held reader, or a fixed collection unit 114, depicted as a transmission tower. Though not depicted, an alternative collection unit could include the use of an intermediate transmitter/receiver to extend the range of communication between a collection unit and remote first endpoints 106 and remote second endpoints 110. Regardless of whether data is collected by mobile collection unit 112 or fixed collection unit 114, each collection unit includes a transmitter, a receiver, an input component and a data storage component.

During installation of the first automatic meter reading (AMR) network 104 and the second AMR network 108, each of their components, i.e., remote first endpoints 106 and remote second endpoints 110, are programmed with the current time and date. This provides initial reference points for use by the logic circuits within the components. Each component of the first AMR network 104 is also preprogrammed to recognize a first network data sequence or ID 116 while each component of the second AMR network 108 is preprogrammed to recognize a second network ID 118. First network ID 116 and second network ID 118 each comprise a unique sequence of data bits in which neither the sequence nor its inverse is capable of repetition within a data string of specified length. In one embodiment, first network ID 116 and second network ID 118 each comprise ten data bits, thus providing the possibility for fourteen unique system ID's, or in other words, fourteen AMR networks within the geographic area 100. Unique bit sequences including inverse sequences for a ten data bit ID are listed in Table 1.

TABLE 1

Unique Sequences for Use in Ten Character Data Bits

| Application Reference Number | System ID | Counter Bit = 0 | Counter Bit = 1 |
| --- | --- | --- | --- |
| 116 | 1 | 0000000000 | 1111111111 |
| 118 | 2 | 0000000010 | 1111111101 |
| N/A | 3 | 0000000110 | 1111111001 |
| N/A | 4 | 0000001010 | 1111110101 |
| N/A | 5 | 0000001110 | 1111110001 |
| N/A | 6 | 0000011010 | 1111100101 |
| N/A | 7 | 0000010110 | 1111101001 |
| N/A | 8 | 0000111010 | 1111000101 |
| N/A | 9 | 0000101110 | 1111010001 |
| N/A | 10 | 0001110110 | 1110001001 |
| N/A | 11 | 0001101110 | 1110010001 |
| N/A | 12 | 0000011110 | 1111100001 |
| N/A | 13 | 0001011110 | 1110100001 |
| N/A | 14 | 0001111010 | 1110000101 |

The above represents the use of sequence inversion keying (SIK), which is a process in which counter bits are multiplied by a fixed pseudo-noise (pn) sequence, or its inverse, based on the data bit value. Use of carefully selected sequences, e.g., those provided in the table above, allows for no duplication between any sequence, or its inverse, with any other sequence or inverse, in any shifted position. In the above, each counter bit consists of 10 data bits, or 20 chips, if Manchester encoded.

The architecture of the present invention utilizes the 10 bit countdown timer, which counts sequentially from an arbitrary starting point (which has a maximum value of 1023) to zero. Each counter bit is encoded as a 10-bit sequence, resulting in 100 data bits per count. The total countdown time is found by taking the number of counts multiplied by 100 then divided by the bit rate. As an example, the total time for a full 1024 counts, at a bit rate of 4800 bps, is 21.333 seconds. Counter bits are sent MSB first and the underlying p/n sequence is also sent MSB first, see FIG. 2. While the present invention includes description of an embodiment in which sequences utilizing ten data bits is described, it will be understood that alternative embodiments are envisioned, for example, first network ID 116 and second network ID 118 can constitute data sequences of twenty data bits, thus providing the possibility of hundreds of unique system ID's.

When installed, the logic circuit, including a timer, present within the remote first endpoints 106 and the remote second endpoints 110 is preprogrammed to turn on the receiver at selected times. For example, the timer can be programmed to turn on the receiver at the top of every hour, every two hours, every three hours, etc. When turned on, the receiver looks to identify the specific network identification to which the receiver component belongs. For example, in the embodiment in which the first network ID 116 and the second network ID 118 comprise unique sequences of ten data bits, the receiver looks to identify either the particular ten data bit sequence or its inverse to verify that data is being actively sought from the AMR network for which the receiver is a component. In the case where the first network ID 116 and the second network ID 118 comprise unique sequences of ten data bits, the receiver can identify whether or not its unique network ID is being transmitted by the mobile collection unit 112 or fixed collection unit 114 within twenty data bits. If the receiver fails to identify the unique sequence representing the network ID or its inverse, the logic circuit turns off the meter to avoid further battery consumption.

Generally, a utility will desire information from the remote first endpoints 106 or will desire to transmit information to the remote first endpoints 106. When initially installed, remote first endpoints 106 are preprogrammed to include the current date and time. Typically, the logic circuit will include programming such that the battery powers up the receiver at or just prior to the top of each hour such that the receiver can receive signals being transmitted by the collection unit. Preferably, the collection unit begins transmitting signals at a time just prior to the scheduled power up of the remote first endpoints 106. If communication with the first AMR network 104 is desired, the collection unit will transmit first network ID 116, or its inverse, in a repeating fashion.

Generally, the remote first endpoint 106 conducts an initial three step inquiry to attempt to verify that the collection unit is attempting to communicate with the first AMR network 104. In Step 1, the remote first endpoints 106 attempt to identify a sequence of five data bits which correlate to first network ID 116 or its inverse. If a sequence of five such data bits is identified, the data bits are decoded and used in Step 2. If not, the receiver is shut down so as to limit battery usage within remote first endpoint 106. In Step 2, the five data bits from Step 1 are placed into a ten bit sliding correlator and up to fifteen additional bits are sampled. If a correlation is found between the first network ID 116 or its inverse within the twenty bits, the logic circuit proceeds to Step 3. If there is no correlation, the receiver is shut down. In Step 3, the next ten data bits are checked for correlation with the first network ID 116. If there is a correlation, communication between the first AMR network 104 and the collection units can commence in either a true two-way fashion on in a one-way fashion. If there is no correlation, the receiver is shut down.

Through the use of unique data bit sequences, various degrees of intercommunication can be established between the components comprising the AMR networks and the collection units. In one embodiment, the AMR networks can comprise components including sophisticated logic controllers with the capability of conducting true two-way communication with the collection units for purposes of collecting specified data as well as conducting remote updating and configuration of the components. In another embodiment, the fixed networks can comprise less sophisticated components in which component functions can be related to unique data bit sequences transmitted by the collection units for purposes of collecting specified data or remotely updating and configuring the components.

Figure 2:
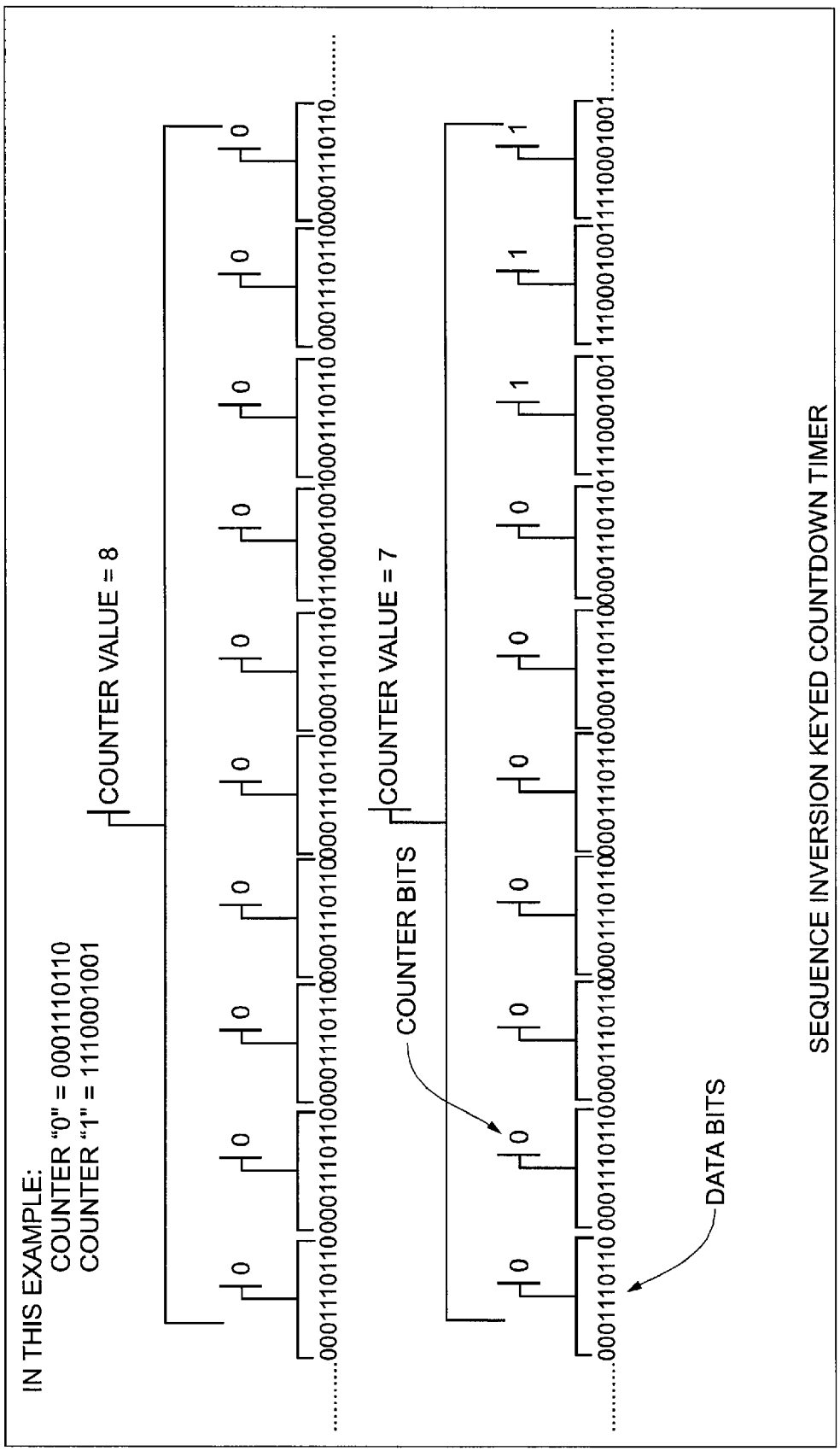
FIG. 2 illustrates an example of a sequence inversion keyed (SIK) countdown timer.
Figure 3:
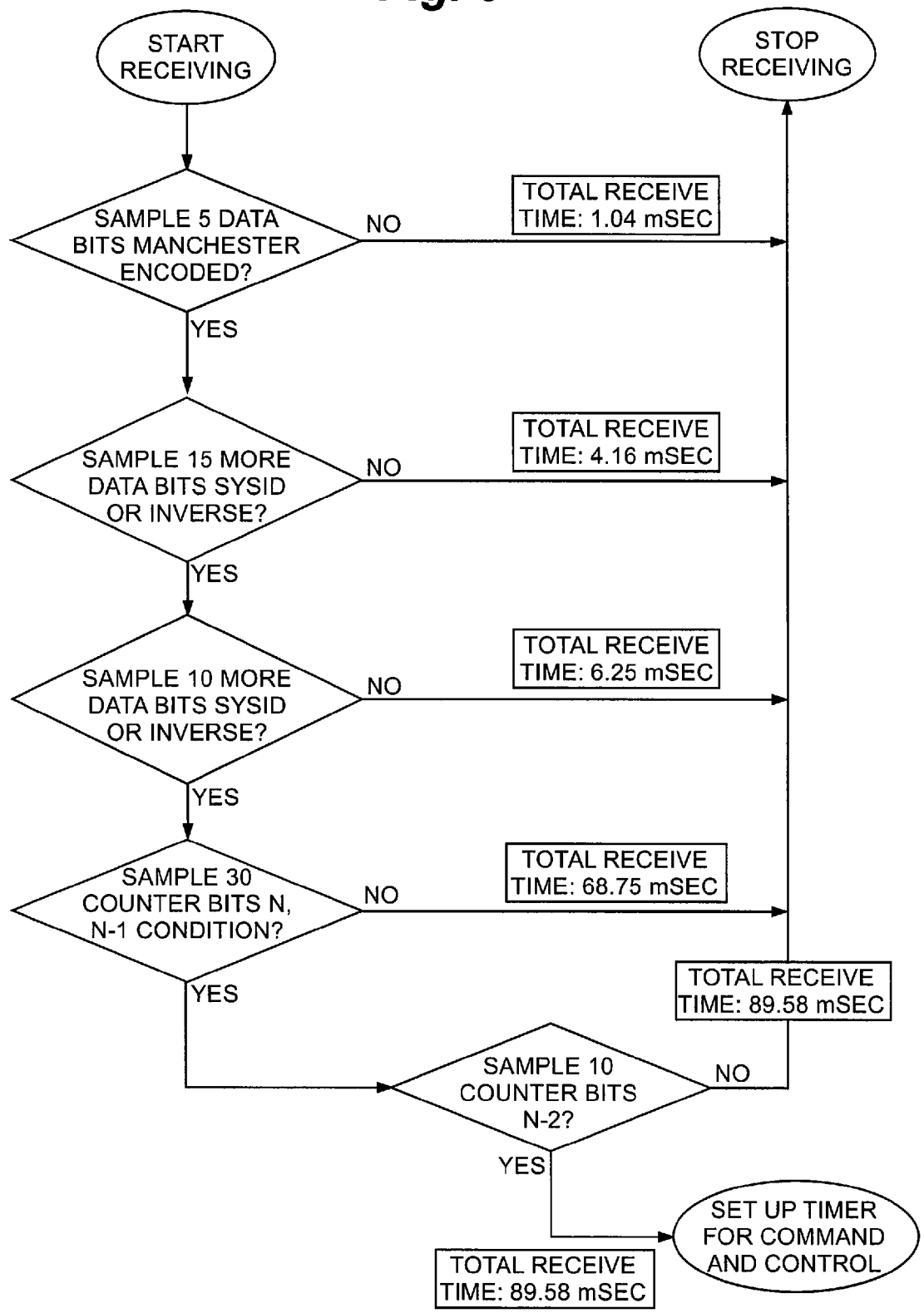
FIG. 3 illustrates a process for initiating 2-way communication between a fixed network and a collection unit.

In an embodiment in which first network ID 116 comprises remote first endpoints 106 capable of true two way communication using a ten data bit sequence, a five step communication progress is depicted in FIG. 2. As described previously, the process includes Steps 1, 2, and 3 wherein confirmation is sought of the transmission of first network ID 116 or its inverse. If first network ID 116 or its inverse is identified, the remote first endpoint 106 proceeds to a Step 4 wherein up to 30 clock bits, or 300 data bits, are decoded by an upper correlator and a lower correlator. If the values in the upper correlator and the lower correlator differ by one, the N,N−1 condition, the remote first endpoint 106 proceeds to Step 5. If not correlation is found within 30 clock bits, the receiver is shut down. In Step 5, the remote first endpoint 106 looks for N−2 in the next ten data bits. If N−2 is found, the remote first endpoint 106 synchronizes itself with the collection unit to turn on at the appropriate time to receive command and control data. In the true two-way communication, remote first endpoint 106 actively converses with the collection unit to communicate data, calibration information or other system information.

Figure 4:
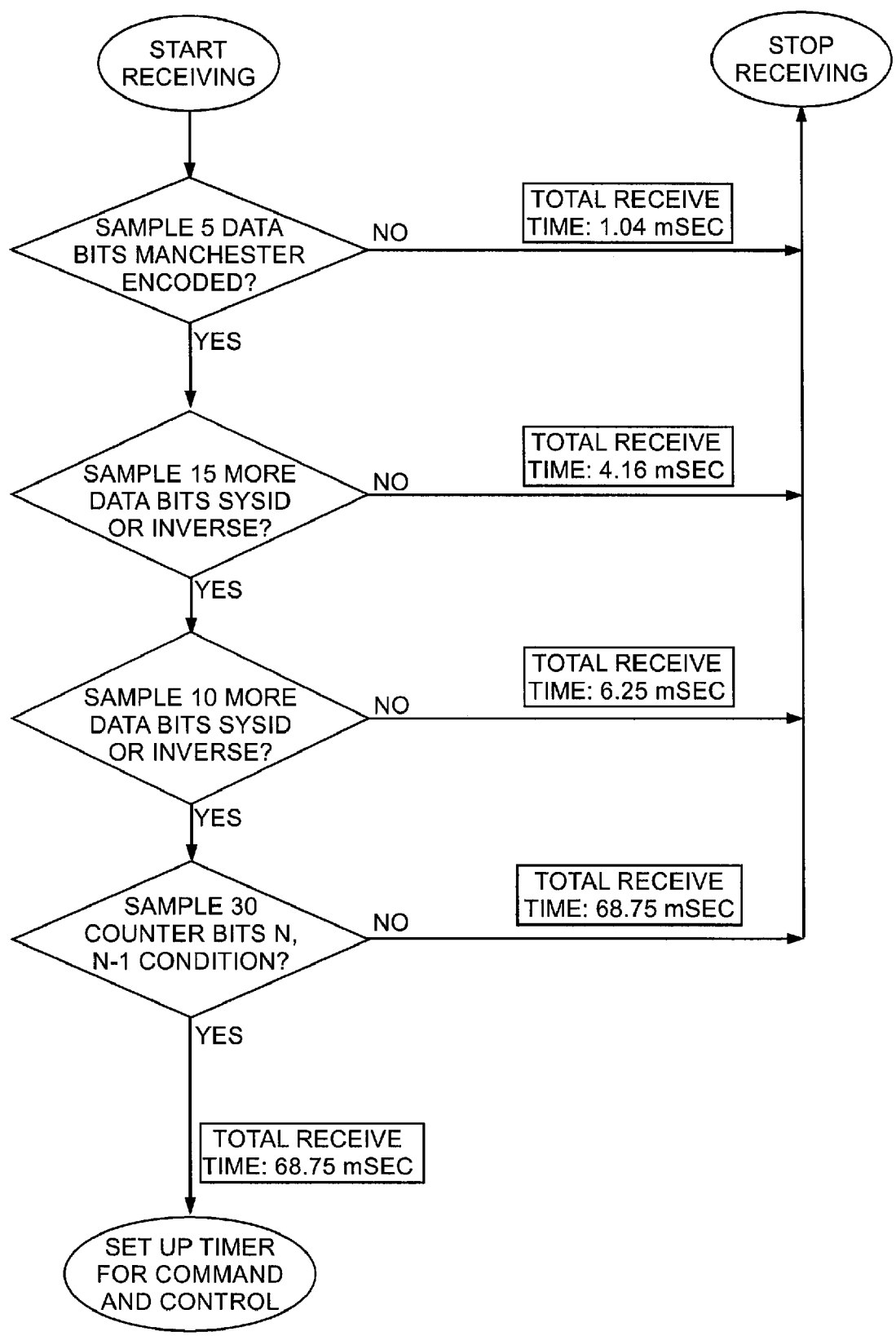
FIG. 4 illustrates a process for initiating 1.5-way communication between a fixed network and a collection unit.

In an embodiment in which first network ID 116 comprises remote first endpoints 106 capable of one-way communication using a ten data bit sequence, a four step communication progress is depicted in FIG. 4. As described previously, the process includes Steps 1, 2, and 3 wherein confirmation is sought of the transmission of first network ID 116 or its inverse. If first network ID 116 or its inverse is identified, the remote first endpoint 106 proceeds to a Step 4 wherein up to 30 clock bits, or 300 data bits, are decoded by an upper correlator and a lower correlator. Remote first endpoints 106 are preprogrammed such that additional ten data bit sequences represent various tasks to be performed. If the values in these 300 data bits correlate to the preprogrammed data bit sequences or their inverse, the remote first endpoints 106 perform the task and transmit requested information to the collection units.

The following describes one preferred embodiment for utilizing the sequence inversion keyed countdown timer of the present invention. This approach utilizes a simplified head end controller and endpoint for high capacity synchronous data recovery that is capable of accurate time stamping of the data. The approach allow for straightforward implementation of multiple message integration techniques because of the known response time of the endpoints. It also allows high capacity cells (more endpoints per controller) with no overhead management for smaller systems if the response slot is based upon the serial number.

Specifically, the sequence inversion keyed countdown timer is used as the clock to count down to the top of each hour. This requires 24 unique sequences to account for each hour of the day. Alternatively, 12 sequences can be used in conjunction with resetting the endpoint clock every two hours.

The endpoint is preferably programmed with the current time and date at installation and wakes up approximately 15 seconds prior to the top of the hour to listen for the SIK countdown signal being emitted from the controller. The SIK countdown preferably runs from 30 seconds prior to the top of the hour until the top of the hour. The endpoint synchronizes its internal clock to the signal at any point during the 30 seconds. Based on the properties of the SIK countdown, the endpoint does not have to listen to the entire sequence to know where the exact top of the hour is located. This approach is very efficient in terms of battery usage because the endpoint is only up and running for about 100 ms per hour.

In normal operation the endpoint has a default slot in which to respond to the system. The slots are preferably 250 ms in length and start at the top of the hour and run until 1 minute prior to the next hour mark. Therefore, there will be 30 seconds of dead air time between the start of the time mark and the end of the endpoint data transmissions. This timing allows for 14396 slots per hour. If additional slots are needed the synchronization interval can be extended to two hours and the resulting 28792 slots. This is quite efficient for any low end water utility, apartment complex, or other sub-metering application.

If the endpoint gets lost, i.e., it does not hear the SIK sequence within X hours, the endpoint will come up every 30 seconds to check for the countdown sequence thus automatically re-acquiring the system. Otherwise, the endpoint is only in the receive mode for about 100 ms every hour to resynchronize and about 30 milliseconds to transmit; a battery-friendly approach.

This specific approach is appropriate for small utilities or micro networks where the full sync and control may be overkill. However, it can utilize the reading technology and software, described in the related applications, without the need for complex head end control. The central control unit only has to pick the correct SIK sequence to send out based on time. As such, the present invention can be utilized to simplify the head end control and the cost needed for a small utility to implement a fixed network to collect time stamped data on a recurring basis.

In relation to small utility systems, prior art technology has used a pure transmit bubble up technology, e.g., Hexagram, with a low repetition rate. However, with a pure bubble up system there is no guarantee that there will not be a collision in the inbound data packets since the endpoints are not synchronized. The limits the capacity of a given cell. Additionally, it is difficult to implement message integration techniques on messages that are not on a predictable interval. The approach described immediately above enables the solving of both issues while maintaining excellent battery life and keeping the head end control logic simple and cost-effective for smaller installations. As such, the SIK countdown timer sequence of the present invention simplifies the head, reader, and endpoint logic needed to implement a synchronized system.

The present invention may be embodied in other specific forms without departing from the spirit of the essential attributes thereof, therefore, the illustrated embodiment should be considered in all respects as illustrative and not restrictive, reference being made to the appended claims rather than to the foregoing description to indicate the scope of the invention.

What is claimed:

1. An automatic meter reading (AMR) system, comprising;
   an endpoint;
   an AMR system device external to said endpoint;
   wherein the endpoint is interfaced to a utility meter, wherein said endpoint includes and internal clock, wherein said AMR system device is capable of communicating with said endpoint via RF communication, wherein said AMR system device generates a clock countdown signal through the use of sequence inversion keying (SIK), and wherein said endpoint synchronizes said internal clock to said clock countdown signal during generation of said clock countdown signal by said AMR system device.

2. The system of claim 1, wherein said clock countdown signal is generated for less than 60 seconds for each hour in the day.

3. The system of claim 2, wherein said internal clock is synchronized to said clock countdown signal every hour of the day.

4. The system of claim 1, wherein said internal clock is synchronized to said clock countdown signal at any point during the generation of said clock countdown signal.

5. The system of claim 1, wherein said endpoint is battery powered, and wherein said endpoint operates on said battery for less than 200 milliseconds to synchronize the internal clock to said clock countdown signal.

6. The system of claim 1, wherein said endpoint includes the ability to re-acquire said clock countdown signal if said endpoint loses said clock countdown signal.

7. An automatic meter reading (AMR) system, comprising:
   means for interfacing with a utility meter, wherein said means for interfacing includes means for establishing an internal time; and
   means for communicating with said means for interfacing via RF communication, wherein said means for communicating additionally for generating a clock countdown signal through the use of sequence inversion keying, wherein said means for establishing an internal time additionally for synchronizing said internal time to said clock countdown signal.

8. The system of claim 7, wherein said means for generating said clock countdown signal generates the signal for less than 60 seconds for each hour in the day.

9. The system of claim 8, wherein said means for establishing an internal time synchronizes every hour of every day.

10. The system of claim 7, wherein said means for establishing an internal time additionally for synchronizing said internal time to said clock countdown signal at any point during generation of said clock countdown signal.

11. The system of claim 7, wherein said means for interfacing includes means for independently powering itself, and wherein said means for interfacing utilizes said means for independently powering for less than 200 milliseconds while said means for establishing an internal time synchronizes to said clock countdown signal.

12. A method for communication in an automatic meter reading system, comprising:
    generating a clock countdown signal through the use of sequence inversion keying (SIK);
    transmitting said clock countdown signal via RF communication;
    obtaining the transmitted clock countdown signal;
    synchronizing a clock to the obtained clock countdown signal; and
    time-stamping utility meter data according to a time on the synchronized clock.

13. The method of claim 12, wherein said step of generating a clock countdown signal comprises generating said clock countdown signal for less than 60 seconds for each hour in the day.

14. The method of claim 13, wherein said step of synchronizing comprises synchronizing every hour of every day.

15. The method of claim 12, wherein said step of synchronizing occurs at any point during said step of generating.

16. The method of claim 12, further comprising the step of independently powering said clock, and wherein said step of independently powering occurs for less than 200 milliseconds during said step of synchronizing said clock.

17. The method of claim 12, wherein the generating of a clock signal and the transmitting of said clock signal are performed by a meter reading device.

18. The method of claim 12, wherein the generating of a clock signal and the transmitting of said clock signal are performed by a meter reading device that includes a head end controller.

19. The method of claim 12, wherein the obtaining of the transmitted clock countdown signal and the synchronizing of the clock is performed by an endpoint device.

20. The system of claim 1, wherein the AMR system device external to said endpoint is a head end controller.

* * * * *